US006637164B2

(12) United States Patent
Kondo et al.

(10) Patent No.: US 6,637,164 B2
(45) Date of Patent: Oct. 28, 2003

(54) VEHICULAR RESINOUS WINDOW AND VEHICULAR DOOR PANEL

(75) Inventors: Takanobu Kondo, Chita-gun (JP); Akio Ishiguchi, Chita-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/912,543

(22) Filed: Jul. 26, 2001

(65) Prior Publication Data

US 2002/0046517 A1 Apr. 25, 2002

(30) Foreign Application Priority Data

Jul. 31, 2000 (JP) ........................................ 2000-231530

(51) Int. Cl.[7] ............................................. E06B 3/00
(52) U.S. Cl. ................................... 52/208; 296/146.15
(58) Field of Search .............................. 428/122, 192, 428/38, 358, 167; 52/204.591, 204.69, 716.6, 208, 393, 716.5, 204.62, 717.01; 296/93, 190.1, 146.15, 201; 264/260

(56) References Cited

U.S. PATENT DOCUMENTS

| | | | | |
|---|---|---|---|---|
| 4,343,121 A | * | 8/1982 | Kruschwitz | 52/208 |
| 4,353,111 A | * | 10/1982 | Gallitzendorfer | 362/80 |
| 4,530,192 A | * | 7/1985 | Ginster | 52/397 |
| 4,874,654 A | | 10/1989 | Funaki et al. | |
| 4,884,380 A | * | 12/1989 | Yada | 52/208 |
| 4,984,839 A | * | 1/1991 | Miyakawa | 296/93 |
| 5,008,143 A | * | 4/1991 | Armanini | 428/207 |
| 5,176,420 A | * | 1/1993 | Kato | 296/93 |
| 5,372,491 A | | 12/1994 | Fritsch et al. | |
| 5,618,079 A | * | 4/1997 | Yukihiko et al. | 296/93 |

FOREIGN PATENT DOCUMENTS

EP        0 805 070 A2    11/1997

OTHER PUBLICATIONS

Patent Abstract of Japan, JP 6–190865, Jul. 12, 1994.
Patent Abstract of Japan, JP 9–174599, Jul. 8, 1997.

* cited by examiner

*Primary Examiner*—Gwendolyn Baxter
(74) *Attorney, Agent, or Firm*—Oblon, Spivak, McClelland, Maier & Neustadt, P.C.

(57) ABSTRACT

A vehicular resinous window including a transparent portion and an opaque portion incorporated with an outer periphery of the transparent portion. The transparent portion and the opaque portion are molded by multicolor injection molding. The transparent portion and the opaque portion have a boundary portion provided therebetween on a vehicular exterior side, such that the boundary portion has a groove provided in at least a portion thereof.

14 Claims, 6 Drawing Sheets

VEHICULAR RESINOUS WINDOW AND VEHICULAR DOOR PANEL

The present invention relates to a vehicular resinous window usable for, e.g., an automobile window, and a vehicular door panel.

In later years, transparent sheets made of a synthetic resin have been increasingly used as automobile window materials since the transparent sheets are lightweight and good at strength. When the resinous sheets are used as automobile window materials, the resinous sheets have been molded by multicolor injection molding so that the resinous sheets have a central portion molded from a transparent resinous material and an opaque resinous material molded around an outer periphery of the transparent resinous material to conceal, e.g. a joined portion with a bodywork frame.

The vehicular resinous windows, which have the transparent portion and the opaque portion incorporated together as stated earlier, are generally molded so that the vehicular exterior side of the transparent portion and that of the opaque portion have an equal height.

However, when the transparent portion and the opaque portion are molded so as to have merging smooth surfaces on the vehicular exterior side, a flash is produced at an boundary portion between the transparent portion and the opaque portion in some molds. The flash is required to be trimmed, and it has been extremely difficult to trim the flash. Specifically, a hard coating is normally applied to the vehicular exterior side of the transparent portion to prevent the window material from being scratched, and it has been difficult to exactly trim only the flash without scratching the hard coating.

When hard coat treatment is applied on an outer surface of the transparent portion, or the vehicular exterior side of the opaque portion is painted in the conventional vehicular resinous windows, a masking tape is normally applied to prevent unnecessary portions from being coated or painted. This creates problems in that the application of the masking tape requires great care and much time, lower working efficiency.

Considering the problems, the present invention provides a vehicular resinous window and a vehicular door panel capable of making flash trimming work easy, improving an exterior shape, and guiding rainwater so as to prevent the rainwater from flowing dispersedly around.

According to the present invention, there is provided a vehicular resinous window comprising a transparent portion, and an opaque portion incorporated with an outer periphery of the transparent portion, the transparent portion and the opaque portion being molded by multicolor injection molding, wherein the transparent portion and the opaque portion have a boundary portion provided therebetween on a vehicular exterior side, the boundary portion having a groove provided in at least a portion thereof.

In the vehicular resinous window, the groove may have a width of 0.5 to 5.0 mm and a depth of 0.5 to 5.0 mm. The groove may have a width size reduced from the vehicular exterior side toward a vehicular interior side, and the groove may have a side wall inclined at an angle of not less than 1° with respect to a plane perpendicular to a bottom thereof. Additionally, the groove may have a molding engaged therewith for concealment.

As a mode of the present invention, there is provided a vehicular door panel comprising a vehicular door main body, and a vehicular resinous window mounted to the vehicular door main body, the vehicular resinous window including a transparent portion, and an opaque portion incorporated with an outer periphery of the transparent portion, the transparent portion and the opaque portion being molded by multicolor injection molding, wherein the transparent portion and the opaque portion have a boundary portion therebetween on a vehicular exterior side, the boundary portion having a groove provided in at least a portion thereof, and the vehicular resinous window is mounted to the door main body to provide a rainwater guide by the groove.

In accordance with the vehicular resinous window of the present invention, the boundary portion between the transparent portion and the opaque portion on the vehicular exterior side has the groove provided in at least a portion thereof. When the groove has a width of 0.5 to 5.0 mm and a depth of 0.5 to 5.0 mm, a boundary line becomes unnoticeable, improving the exterior shape. With regard to a flash produced at the boundary line in the bottom of the groove, it is possible to easily and reliably trim the flash without scratching the vehicular exterior side of the transparent portion or the opaque portion when the groove has a width of 0.5 to 5.0 mm and a depth of 0.5 to 5.0 mm. When a cover, which is provided with an engagement portion engageable with the groove, is utilized for painting the transparent portion or the opaque portion or another purpose, it becomes possible to eliminate a troublesome work, such as application of a masking tape as was conventionally done. When a molding is introduced into the groove and is fixed therein, the exterior shape of the vehicular resinous window can be further improved.

In accordance with the door panel with the vehicular resinous window according to the present invention, the rainwater guide is provided to collect rainwater in the groove, preventing the rainwater from flowing dispersedly around.

Now, preferred embodiments of the present invention will be described in reference to the accompanying drawings.

Figure 1:
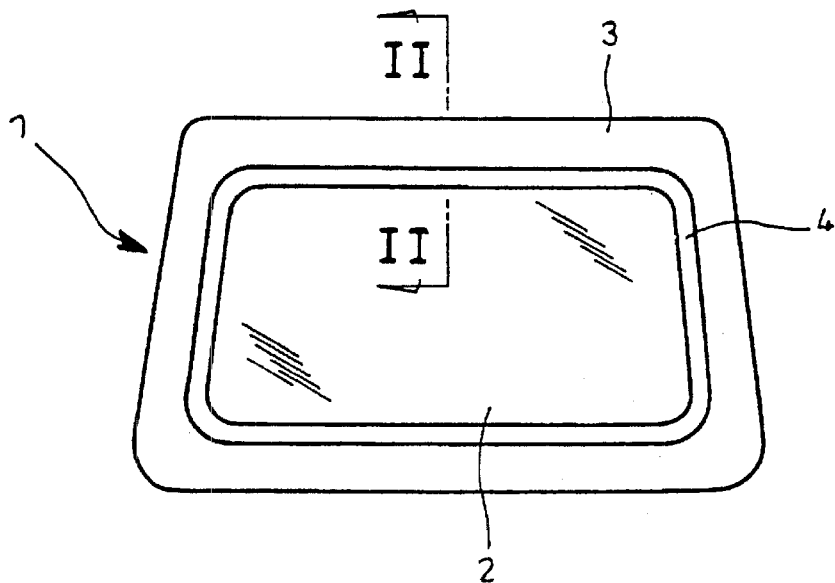
FIG. 1 is a front view showing an example of the exterior shape of the vehicular resinous window according to the present invention.
Figure 2:
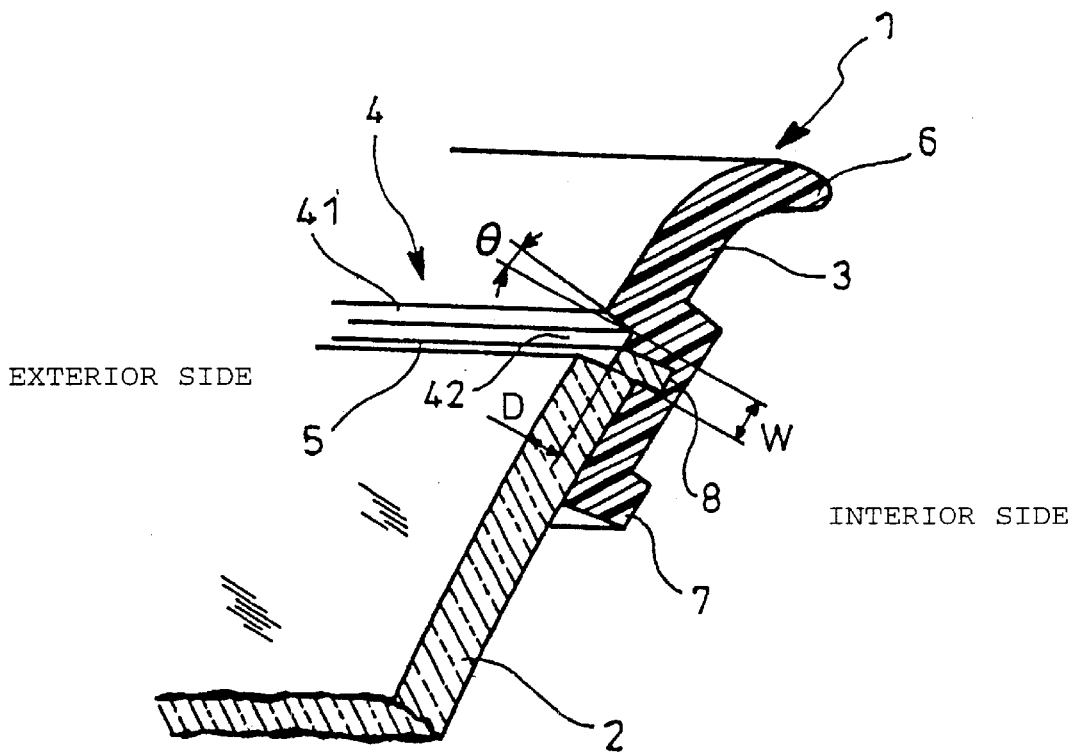
FIG. 2 is a cutaway perspective view taking viewing FIG. 1 in a direction of II—II.

FIG. 1 is a front view showing an example of the exterior shape of the vehicular resinous window according to the present invention, and FIG. 2 is a cutaway perspective view taken viewing FIG. 1 in a direction of II—II. The vehicular resinous window 1 includes a transparent portion 2 made of a transparent resinous material, and an opaque portion 3 incorporated with an outer periphery of the transparent portion 2 and made of an opaque resinous material. The transparent portion 2 and the opaque portion 3 are integrally molded of the transparent resinous material and the opaque resinous material by multicolor injection molding (two color injection molding in this case), respectively.

The transparent portion 2 and the opaque portion 3 may be provided by molding both portions of a common resinous material and coloring one of the portions without coloring the other portion. Both portions may be molded of different kinds of resinous materials as long as the different resinous materials have affinity each other and as long as required strength can be obtained after integral molding. By multicolor injection molding, the vehicular resinous window 1 may be molded of three different colors of resinous materials, such as the opaque portion 3 having different colors, and the transmission rate of the opaque portion 3 having a plurality of patterns. Now, explanation will be made with respect to two color molding as a typical example.

As shown in FIG. 2, the vehicular resinous window 1 is configured so that the opaque portion 3 is integrally molded to the transparent portion 2 so as to overlap with an outer peripheral portion of the transparent portion 2 on an vehicular interior side by a certain width. Thus, the outer peripheral portion of the transparent portion 2 is opaque at the overlapped portion with the opaque portion 3.

The vehicular resinous window 1 has a groove 4 provided at a boundary portion between the transparent portion 2 and the opaque portion 3 on an vehicular exterior side. The groove 4 may be provided along the boundary portion at the entire circumference of the transparent portion 2 so as to surround the transparent portion 2 or be provided at a portion of the circumference. When the groove 4 is provided at the boundary portion as stated earlier, a boundary line 5, which is provided between the transparent portion 2 and the opaque portion 3, extends along the bottom of the groove 4.

The opaque portion 3 shown in FIG. 2 has an outer peripheral portion provided with a curved portion 6, which is curved toward the vehicular interior side to fix the opaque portion to a frame of an automobile or another member. The opaque portion 3 has an inner peripheral portion provided with a reinforcing rib 7, which projects toward the vehicular interior side. The transparent portion has the outer peripheral portion on the vehicular interior side provided with a projection 8, which projects into the opaque portion 3 to serve to form the groove 4 during injection molding.

In this example, the dimensions of the groove 4, which is provided at the boundary portion between the transparent portion 2 and the opaque portion 3, are a width W of not less than 4 mm and a depth D of not less than 3 mm. The groove 4 has a side wall 41 inclined at an angle of 2° with respect to a plane perpendicular to a bottom 42 of the groove 4 so that the groove has a width size reduced from the vehicular exterior side toward the vehicular interior side (The angle θ between the plane perpendicular to the bottom 42 and the side wall 41 is 2°).

Figure 3:
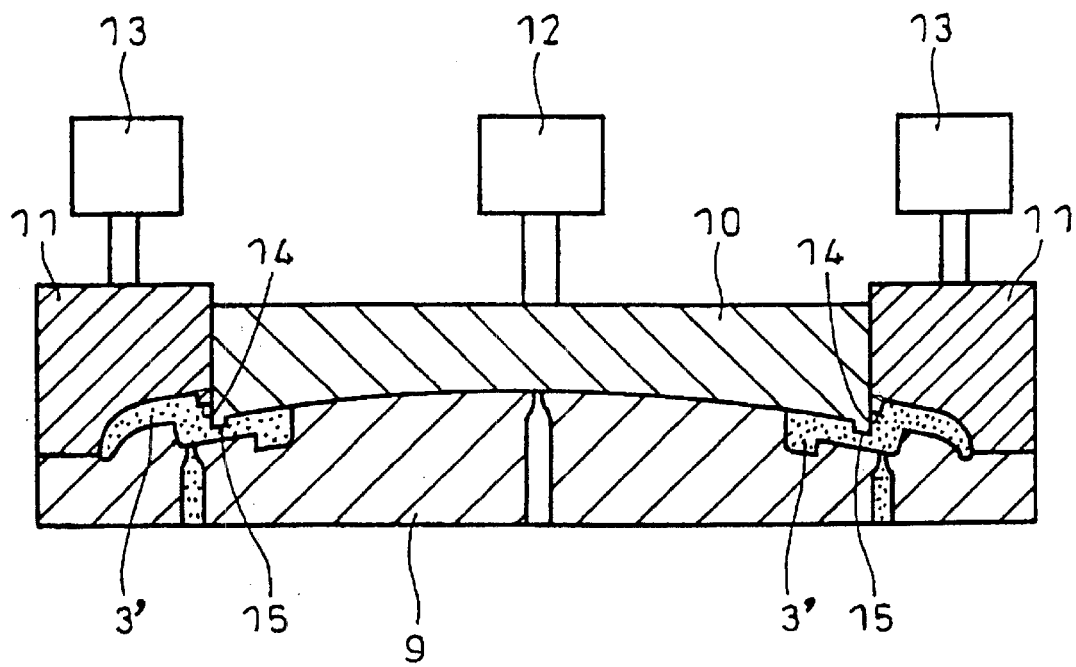
FIG. 3 is a cross-sectional view of a mold, showing how an opaque portion is molded.

Next, an example of the mold for preparing the vehicular resinous window 1 by two color injection molding will be explained in reference to FIGS. 3 and 4. In FIG. 3, it is shown how the opaque portion 3 is injection molded. When an inner slide core 10 and a cavity mold 11 as an upper half mold are pressed against a lower core mold 9 by actuator 12, 13, there is provided an outer cavity 3' for molding the opaque portion 3.

The cavity mold 11 has a lower and inner peripheral portion provided with a projection 14, which has a width substantially one-half to the width W of the groove 4 and extends downwardly to form the groove 4. On the other hand, the inner slide core 10 has a lower and outer peripheral portion provided with a projection 15, which has a width substantially one-half to the width the groove 4 and extends downwardly to form the groove 4.

When an opaque resinous material is injected into the outer cavity 3' in the state shown in FIG. 3 and is hardened therein, the opaque portion 3 is molded so as to have a cross-sectional shape shown in FIG. 2.

Figure 4:
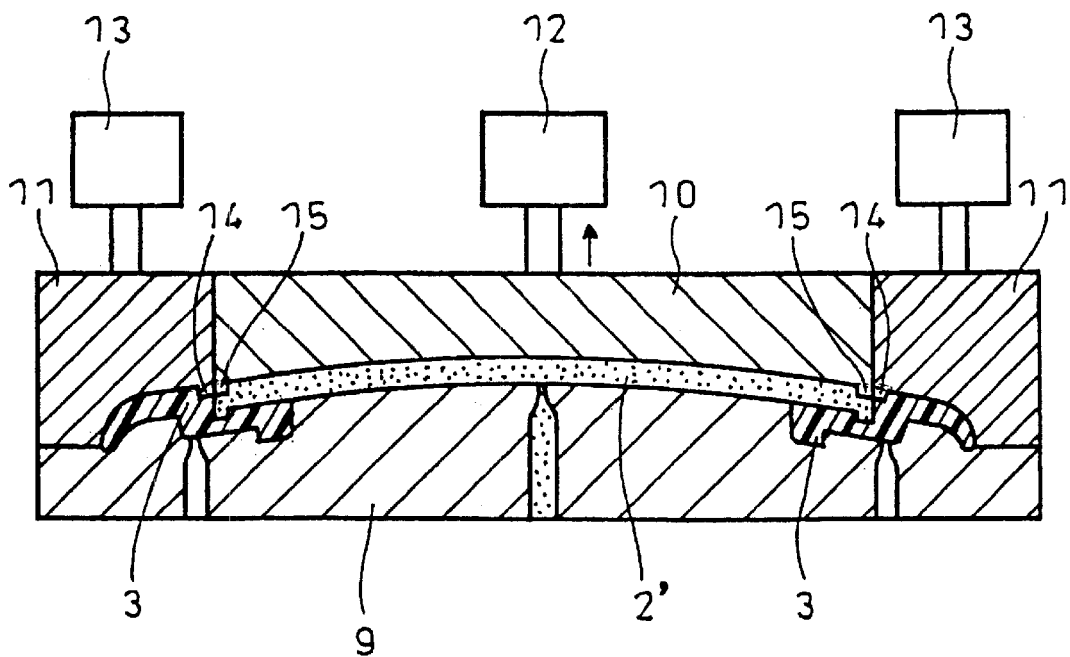
FIG. 4 is a cross-sectional view, showing how a transparent portion is molded.

Subsequently, when the actuator 12 is activated to upwardly withdraw the inner slide core 10 by a certain distance as shown in FIG. 4, an inner cavity 2' is provided between the core mold 9 and the inner slide core 10 so that the inner cavity extends over an upper side of the opaque portion 3 molded as stated earlier, and that the projection 14 of the cavity mold 11 and the projection 15 of the inner slide core 10 are flush each other.

Figure 5:
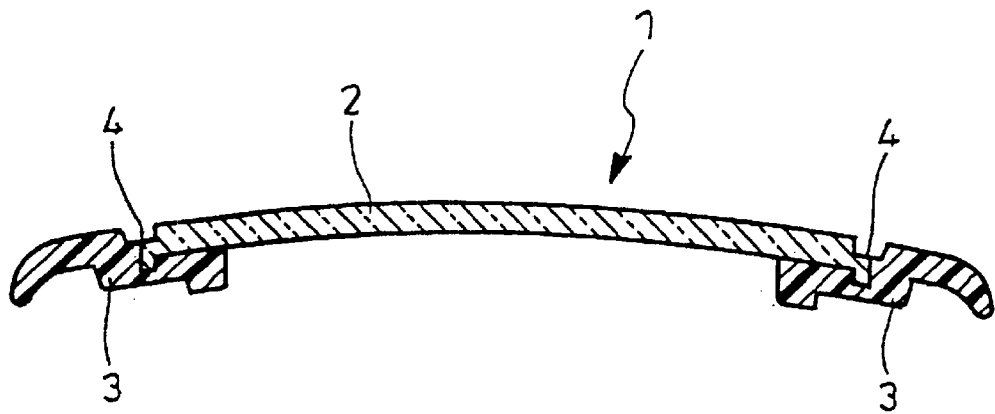
FIG. 5 is a cross-sectional view showing an example of the vehicular resinous window, which is molded by the mold of FIG. 4.

A transparent resinous material is injected into and hardened in the inner cavity 2' in the state shown in FIG. 4, there is provided the vehicular resinous window 1, which has the opaque portion 3 integrally molded to the outer periphery of the transparent portion 2 and the groove 4 formed at the boundary portion between the transparent portion 2 and the opaque portion 3 on the vehicular exterior side as shown in FIG. 5.

As stated earlier, the vehicular resinous window 1, which includes the groove 4 at the boundary portion between the transparent portion 2 and the opaque portion 3 on the vehicular exterior side, has the boundary line 5 between the transparent portion 2 and the opaque portion 3 provided along the bottom of the groove 4 as shown in FIG. 2. At the boundary line 5, a flash could be produced by the boundary between the inner slide core 10 and the cavity mold 11.

Even if such a flash is produced at the bottom of the groove 4, a trimming tool can be simply moved along the groove 4 to remove the flash in easy and reliable fashion without scratching the vehicular exterior side of the transparent portion 2 or the opaque portion 3. By the arrangement wherein the boundary portion between the transparent portion 2 and the opaque portion 3 is located in the groove 4 as stated earlier, the boundary line 5 is concealed and becomes unnoticeable, improving the exterior shape.

Figure 6:
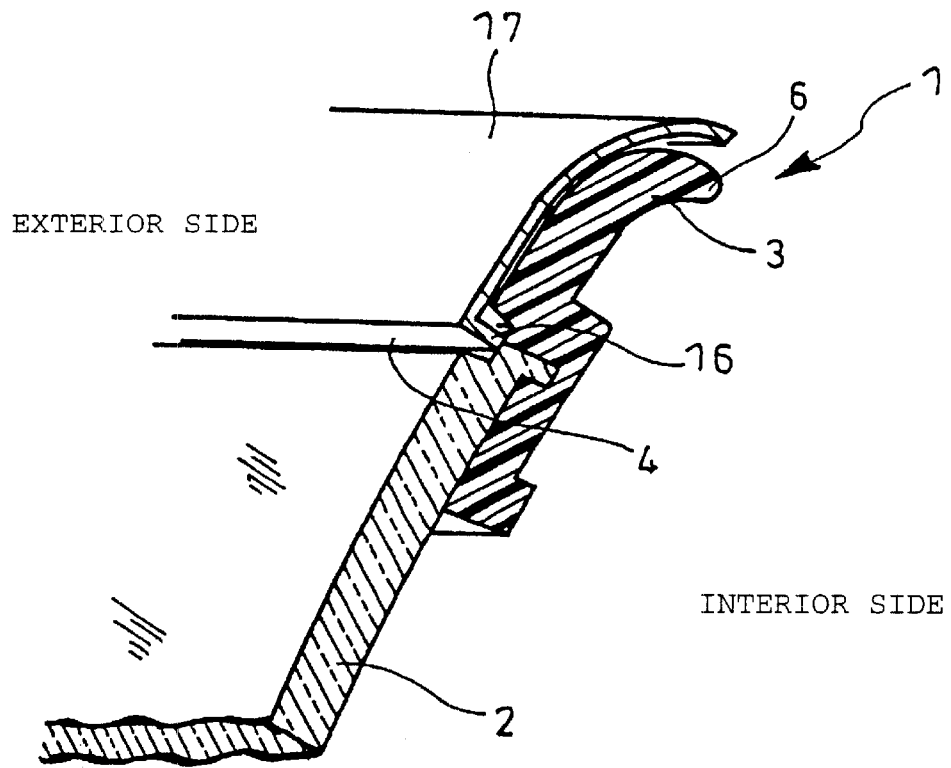
FIG. 6 is a perspective view showing an example wherein a cover is applied to the opaque portion for hard coating treatment of the transparent portion.
Figure 7:
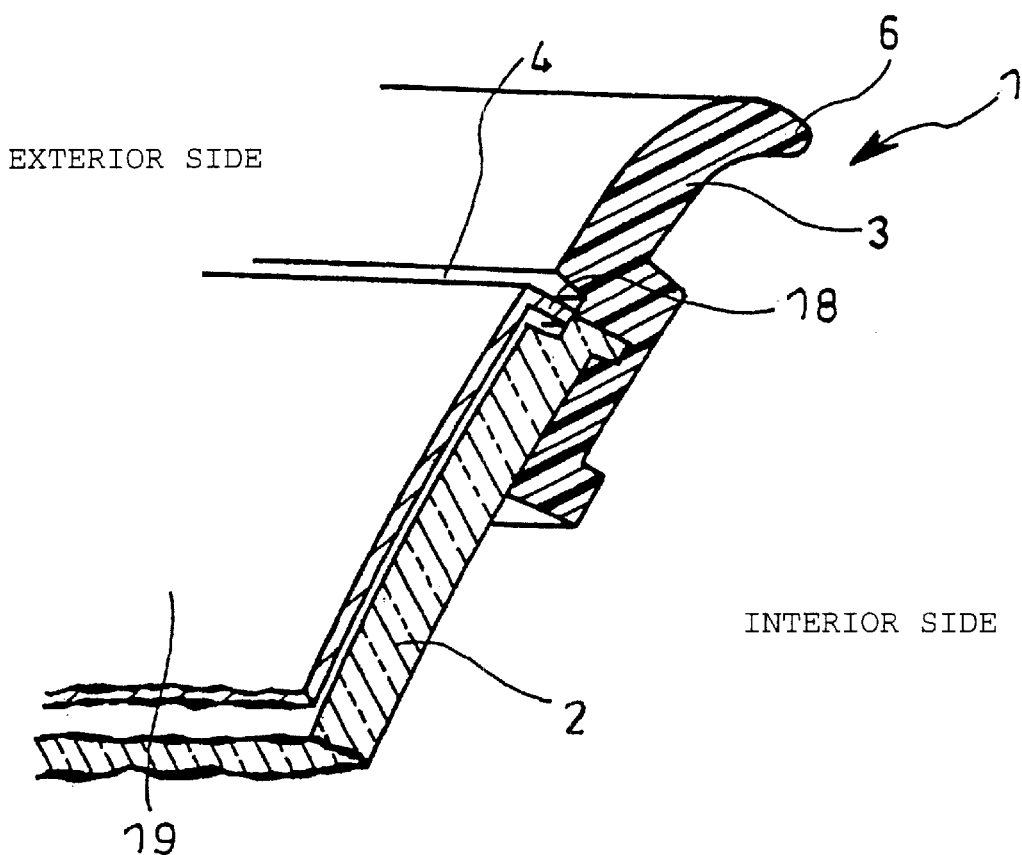
FIG. 7 is a perspective view showing an example wherein a cover is applied to the transparent portion for painting the opaque portion.

When a cover 17 with an engagement portion 16 engageable with the groove 4 is put on the vehicular exterior side of the opaque portion 3 as shown in FIG. 6, hard coating treatment or other treatment can be applied to the vehicular exterior side of the transparent portion 2 without need for troublesome work to apply a masking tape as was conventionally done. On the other hand, when a cover 19 with an engagement portion 18 engageable with the groove 4 is put on the vehicular exterior side of the transparent portion 2 as shown in FIG. 7, painting the vehicular exterior side of the opaque portion 3 or other work can be done without need for troublesome work to apply a masking tape as was conventionally done.

Figure 8:
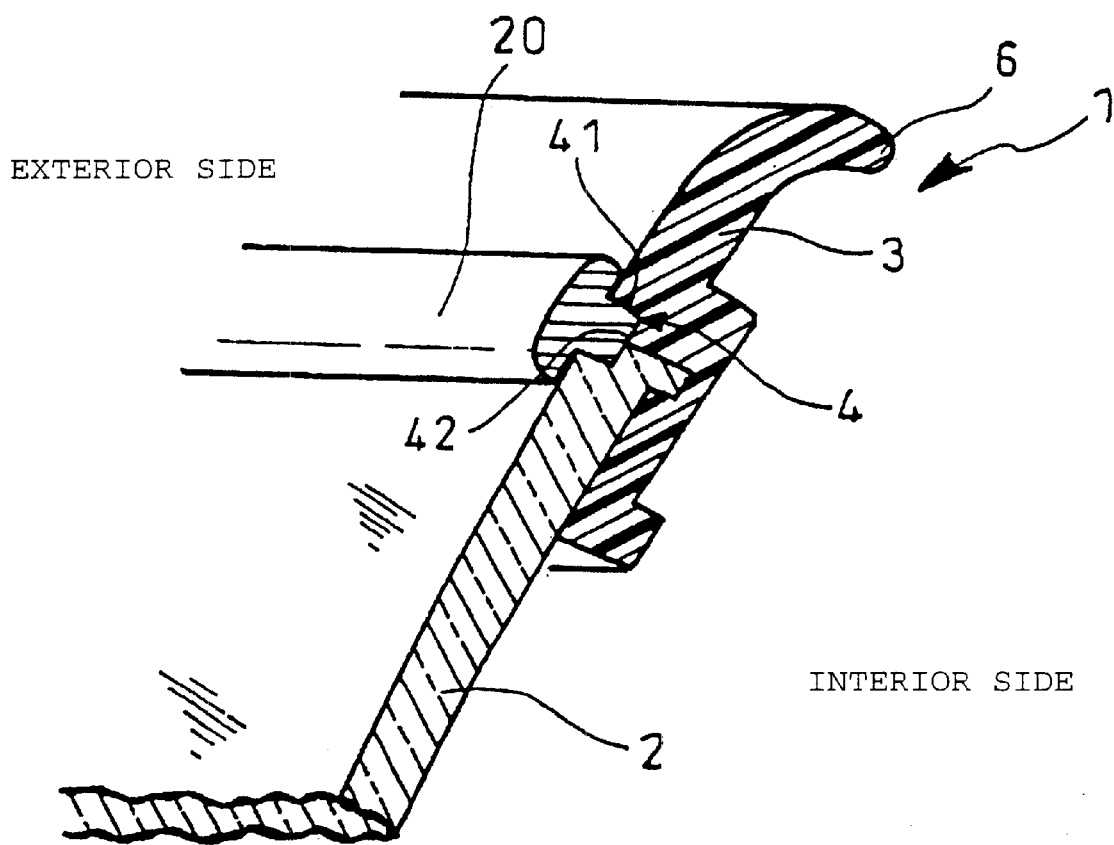
FIG. 8 is a perspective view showing an example wherein a groove has a molding fixed therein.

In FIG. 8, another mode of the vehicular resinous window 1 according to the present invention is shown. In this mode, a molding 20 is introduced into and fixed in the groove 4 provided at the boundary portion between the transparent portion 2 and the opaque portion 3 on the vehicular exterior side as shown in FIG. 8. In this case, if required, an adhesive is used to fix the molding 20 in the groove 4.

When the molding 20 is provided along the groove 4 as stated earlier, the exterior shape of the vehicular resinous window 1 can be further improved. Whether the molding 20 is applied or not is determined, depending on an automobile to have the vehicular resinous window according to the present invention mounted thereto. Considering a case wherein the molding 20 is applied though no molding may be actually applied, the groove 4 preferably has a width W of 0.5 to 5.0 mm and a depth D of 0.5 to 5.0 mm and particularly preferably has a width W of 3.0 to 5.0 mm and a depth D of 2.0 to 5.0 mm as in the example shown in FIG. 2. Additionally, it is preferable that the groove has a side wall 41 inclined at an angle of not less than 1° with respect to a plane perpendicular to the bottom 42 thereof (The angle θ between the plane perpendicular to the bottom 42 of the groove 4 and the side wall 41 is not less than 1°) so that the groove has a width size reduced from the vehicular exterior side toward the vehicular interior side.

Figure 9:
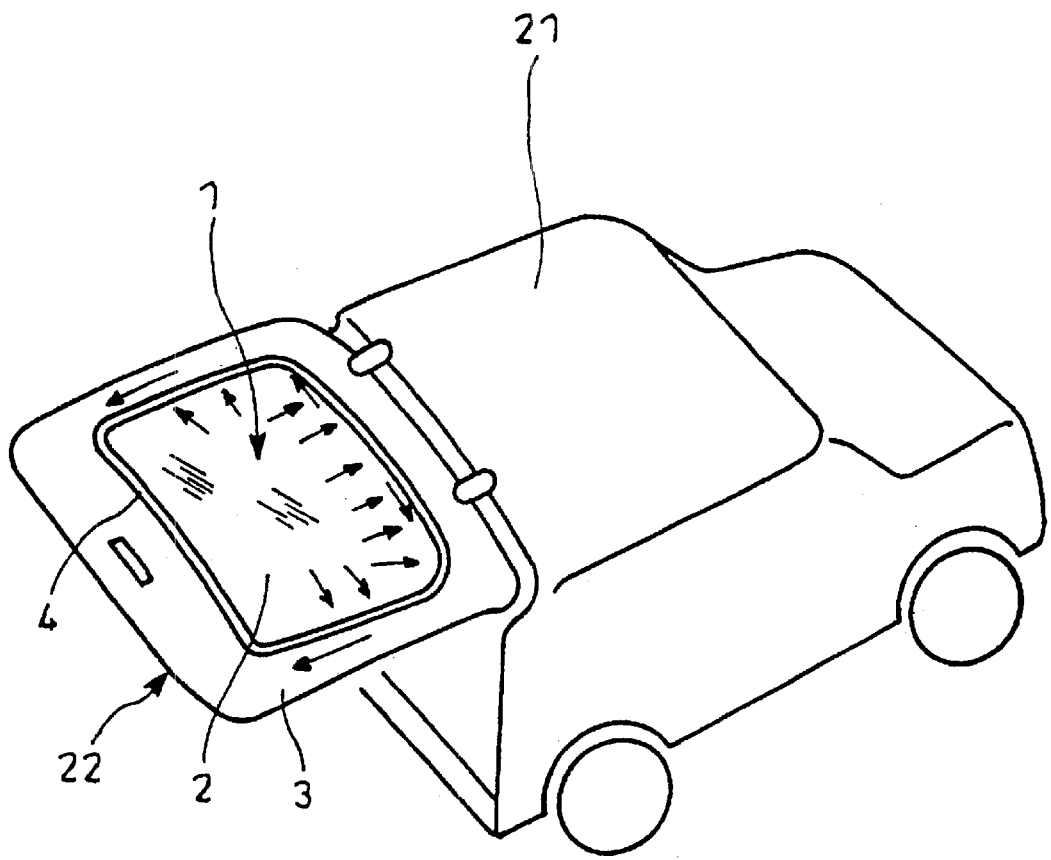
FIG. 9 is a perspective view of a hatchback automobile, showing an example of the door panel according to the present invention.

In FIG. 9, an example of the door panel with the vehicular resinous window 1 utilized therein according to the present invention is shown. In the example of FIG. 9, it is shown that the vehicular resinous window 1 is applied to a tailgate 22 of a hatchback car 21 (a door at the back of a hatchback car). The tailgate 22 as the door may be provided by making the entire structure from the vehicular resinous window 1 or by fixing the vehicular resinous window 1 to a frame of the tailgate 22.

In the case of the tailgate 22 that includes the vehicular resinous window 1 with the groove 4 provided therein at the boundary portion between the transparent portion 2 and the opaque portion 3 on the vehicular exterior side, when the tailgate 22 is fully opened on raining as shown in FIG. 9, the rainwater on the vehicular resinous window 1 flows into the groove 4 in directions indicated by arrows, and the groove 4 serves to collect the rainwater. When the tailgate 22 is closed, the rainwater flows down along portions of the groove 4 on the right and left sides. Thus, the groove 4 serves as a rainwater guide to prevent the rainwater from flowing dispersedly around. In order that the rainwater easily flows toward the groove 4 and is guided along the groove in the example of FIG. 9, the groove 4 preferably has a width W of 0.5 to 5.0 mm and a depth D of 0.5 to 5.0 mm and particularly preferably has a width W of 3.0 to 5.0 mm and a depth D of 2.0 to 5.0 mm as in the example shown in FIG. 2. Additionally, it is preferable that the groove has the side wall 41 inclined at an angle of not less than 1° with respect to the plane perpendicular to the bottom 42 thereof (The angle θ between the plane perpendicular to the bottom 42 of the groove 4 and the side wall 41 is not less than 1°) so that the groove has a width size reduced from the vehicular exterior side toward the vehicular interior side.

From the viewpoint that the rainwater can be drained when the door is opened or closed as stated earlier, it is useful that the vehicular resinous window according to the present invention is applied to a rear window, and that the door panel according to the present invention is applied to a door at the back of an automobile.

It is needless to say that the present invention is not limited to the modes stated earlier, that the exterior shape and the cross-sectional shape of the transparent portion or the opaque portion may be modified to various shapes other than those shown, and that various modifications or changes can be made without departing from the spirit and scope of the present invention.

In accordance with the vehicular resinous window of the present invention, the boundary line becomes unnoticeable to offer an advantage to improve the exterior shape since the groove is provided in the boundary portion between the transparent portion and the opaque portion on the vehicular exterior side. There is also offered an advantage that a flash, which could be produced at the boundary line on the bottom of the groove, can be easily and reliably trimmed without scratching the vehicular exterior side of the transparent portion or the opaque portion. When the cover, which is provided with the engagement portion engageable with the groove, is utilized for painting the transparent portion or the opaque portion or another purpose, there is offered an advantage that it becomes to eliminate troublesome work, such as application of a masking tape as was conventionally done. When the molding is introduced into the groove and is fixed therein, there is offered an advantage that the exterior shape of the vehicular resinous window can be further improved.

In accordance with the door panel with the vehicular resinous window according to the present invention, there is offered an advantage that the rainwater guide can be provided to collect rainwater in the groove, preventing the rainwater from flowing dispersedly around.

What is claimed is:

1. A vehicular resinous window comprising:
   a transparent portion; and
   an opaque portion incorporated with an outer periphery of the transparent portion;
   the transparent portion and the opaque portion being molded by multicolor injection molding;
   wherein the transparent portion and the opaque portion have a boundary portion provided therebetween on a vehicular exterior side, the boundary portion having a groove provided in at least a portion thereof, and
   wherein the transparent portion includes a projection extending toward a vehicle interior side.

2. The vehicular resinous window according to claim 1, wherein the groove has a width of 0.5 to 5.0 mm and a depth of 0.5 to 5.0 mm.

3. The vehicular resinous window according to claim 1, wherein the groove has a width size reduced from the vehicular exterior side toward the vehicular interior side, and the groove has a side wall inclined at an angle of not less than 1 with respect to a plane perpendicular to a bottom thereof.

4. The vehicular resinous window according to claim 1, wherein the groove has a molding engaged therewith for concealment.

5. The vehicular resinous window according to claim 1, wherein the opaque portion has a reinforcing rib extending along an edge thereof and projecting toward the vehicle interior side.

6. The vehicular resinous window according to claim 1, wherein the projection is provided at the boundary portion.

7. The vehicular resinous window according to claim 1, wherein the projection extends within a recess in the opaque portion.

8. A vehicular door panel comprising:
   a vehicular door main body; and
   a vehicular resinous window mounted to the vehicular door main body, the vehicular resinous window including a transparent portion, and an opaque portion incorporated with an outer periphery of the transparent portion, the transparent portion and the opaque portion being molded by multicolor injection molding;
   wherein the transparent portion and the opaque portion have a boundary portion therebetween on a vehicular exterior side, the boundary portion having a groove provided in at least a portion thereof, and the vehicular resinous window is mounted to the door main body to provide a rainwater guide by the groove, and
   wherein the transparent portion includes a projection extending toward a vehicle interior side.

9. The vehicular door panel according to laim 8 wherein the groove has a width of 0.5 to 5.0 mm and a depth of 0.5 to 5.0 mm.

10. The vehicular door panel according to laim 8, wherein the groove has a width size reduced from the vehicular exterior side toward the vehicular interior side, and the groove has a side wall inclined at an angle of not less than 1° with respect to a plane perpendicular to a bottom thereof.

11. The vehicular door panel according to claim 8, wherein the groove has a molding engaged therewith for concealment.

12. The vehicular door panel according to claim 8, wherein the opaque portion has a reinforcing rib extending along an edge thereof and projecting toward the vehicle interior side.

13. The vehicular door panel according to claim 8, wherein the projection is provided at the boundary portion.

14. The vehicular door panel according to claim 8, wherein the projection extends within a recess in the opaque portion.

* * * * *